United States Patent [19]
Katoh et al.

[11] Patent Number: 5,267,031
[45] Date of Patent: Nov. 30, 1993

[54] COLOR IMAGE PROCESSING APPARATUS

[75] Inventors: Koichi Katoh, Yokohama; Yoshinori Ikeda, Kawasaki; Mitsuru Kurita, Higashi; Hiroyuki Ichikawa, Kawasaki, all of Japan

[73] Assignee: Canon Kabushiki Kaisha, Tokyo, Japan

[21] Appl. No.: 584,644

[22] Filed: Sep. 19, 1990

Related U.S. Application Data

[63] Continuation of Ser. No. 436,256, Nov. 14, 1989, Pat. No. 4,982,277.

[30] Foreign Application Priority Data

Nov. 14, 1988 [JP] Japan ................................ 63-287091

[51] Int. Cl.⁵ ............................................. H04N 1/46
[52] U.S. Cl. ....................................................... 358/527
[58] Field of Search .............................................. 358/80

[56] References Cited

U.S. PATENT DOCUMENTS

| | | | |
|---|---|---|---|
| 4,382,981 | 5/1983 | Stoetzer et al. | 427/105 |
| 4,538,182 | 8/1985 | Saito | 358/80 |
| 4,700,399 | 10/1987 | Yoshida | 382/17 |
| 4,724,477 | 2/1988 | Ellis | 358/80 |
| 4,845,550 | 7/1989 | Urabe et al. | 358/80 |
| 4,873,570 | 10/1989 | Suzuki | 358/80 |
| 5,142,356 | 8/1992 | Usami | 358/80 |

FOREIGN PATENT DOCUMENTS

| | | |
|---|---|---|
| 357507 | 3/1990 | European Pat. Off. . |
| 2559826 | 5/1979 | Fed. Rep. of Germany . |
| 3313392 | 4/1983 | Fed. Rep. of Germany . |
| 3521259 | 12/1985 | Fed. Rep. of Germany . |
| 1401301 | 4/1965 | France . |
| 61-177399 | 8/1986 | Japan . |
| 2119600 | 11/1983 | United Kingdom . |
| 2162716 | 2/1986 | United Kingdom . |

OTHER PUBLICATIONS

Trundell, Television and Video Engineers Pocketbook (1987), pp. 63-65.

Primary Examiner—Howard W. Britton
Attorney, Agent, or Firm—Fitzpatrick, Cella, Harper & Scinto

[57] ABSTRACT

There is provided a color image processing apparatus comprising color conversion circuit for converting image data to a desired color, feature extraction circuit for extracting a feature of the image data and image correction circuit for correcting the image data on the basis of the feature extraction circuit, characterized in that a color conversion processing is executed prior to extraction of feature from the image data.

12 Claims, 12 Drawing Sheets

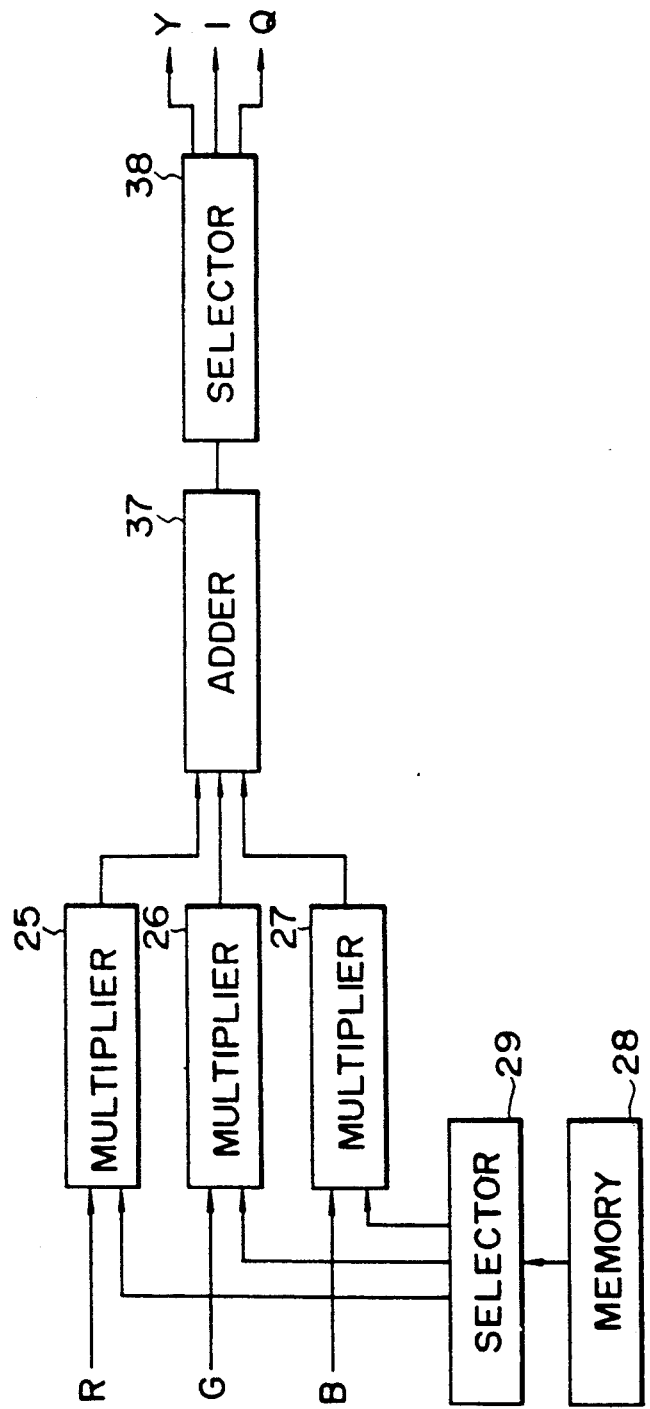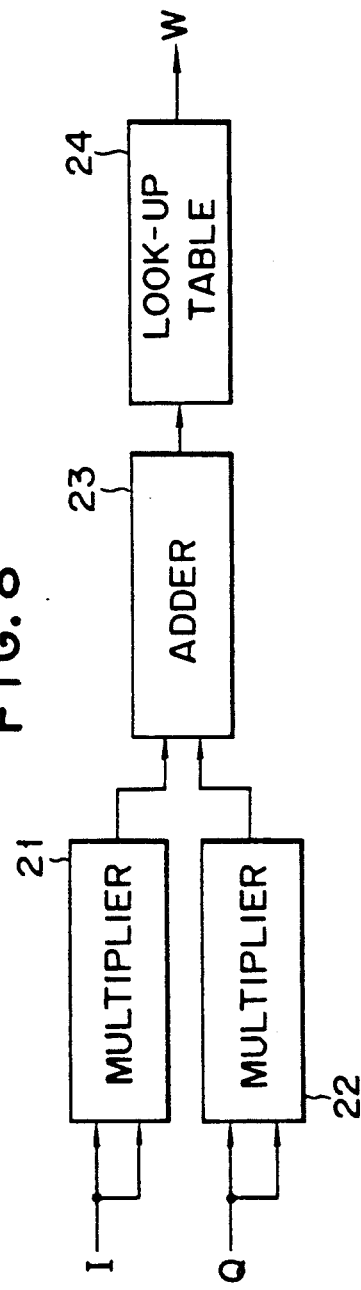

COLOR IMAGE PROCESSING APPARATUS

This application is a continuation of application Ser. No. 07/436,256 filed Nov. 14, 1989, now U.S. Pat. No. 4,982,277.

BACKGROUND OF THE INVENTION

1. Field of the Invention

The present invention relates to a color image processing apparatus.

2. Related Background Art

Hitherto, as is also known as a color laser copier or the like, for instance, a color image processing apparatus having a complicated editing function, a color converting function, and the like using a digital image processing technique has been invented.

A color image processing apparatus as shown in FIG. 3 has been proposed as an apparatus having such character processing function, color converting function, and editing function.

In such an apparatus, in accordance with the level of Bk which is calculated by primary signals Y, M, and C which were color separated, the Y, M, and C signals are subtracted and the Bk signal is increased and the edge is emphasized in accordance with the level which is calculated from Min (Y, M, C). Due to this, the edge portion of a black character is replaced to a single black portion as much as possible, thereby improving the quality of character. However, in such an image processing system, if a color conversion circuit is arranged after the color correction circuit, in the case of executing a color converting process to convert a chromatic character into a black character by the color conversion, the chromatic character cannot obviously be extracted as a black character in a black extraction section. Therefore, subtraction amounts of Y, M, and C are small, so that the color is detected in the color conversion section and is color converted so as to obtain black. On the other hand, since the value of Min (Y, M, C) is small in the black extraction section, a level determination section reduces the edge emphasis in an edge emphasis section as compared with the case of black.

Therefore, the ordinary black character becomes a sharp image by the edge emphasis. However, there occurs an inconvenience such that the character which was converted into black by the color conversion becomes a dull character.

Although the above example has been described with respect to the image process which is executed to a black character, even if the kind of such an image process is another kind of process, if the apparatus is constructed as in the conventional one, an inconvenience corresponding to the process occurs.

SUMMARY OF THE INVENTION

It is an object of the present invention to provide an image processing apparatus which can solve the above problems.

Another object of the invention is to provide an image processing apparatus which can execute both of a process to extract characteristics or the like and a color converting process.

Still another object of the invention is to provide an image processing apparatus which can accurately extract characteristics even when executing a process such as a color conversion or the like.

Under such objects, according to a preferred embodiment of the invention, there is disclosed an image processing apparatus comprising color converting means for converting image data into a desired color, characteristic extracting means for extracting the characteristics of the image data, and image correcting means for correcting the image data in accordance with the characteristics extracted by the characteristic extracting means, wherein the color converting process is executed before the characteristics of the image data are extracted.

Further another object of the invention is to provide an image processing apparatus which can easily execute the processes for color conversion, character correction, and the like to a color image signal obtained by being read.

The above and other objects and features of the present invention will become apparent from the following detailed description and the appended claims with reference to the accompanying drawings.

BRIEF DESCRIPTION OF THE DRAWINGS

FIGS. 6, 6A and 6B are block diagrams for a black character process;

FIG. 7 is a diagram of a calculating circuit of a YIQ signal;

FIG. 8 is a diagram of a calculating circuit of an achromatic signal W;

DETAILED DESCRIPTION OF THE PREFERRED EMBODIMENTS

According to an embodiment of the invention which will be explained hereinlater, there is shown an apparatus in which by using a construction such that the color converting process is executed before the color correcting process, the picture quality of the color converted image and the picture quality of the image which is not color converted are equalized, and the deterioration in picture quality due to a contradiction when respective functions are combined is eliminated.

The invention will be described hereinbelow with reference to the drawings.

Embodiment 1

Figure 1:
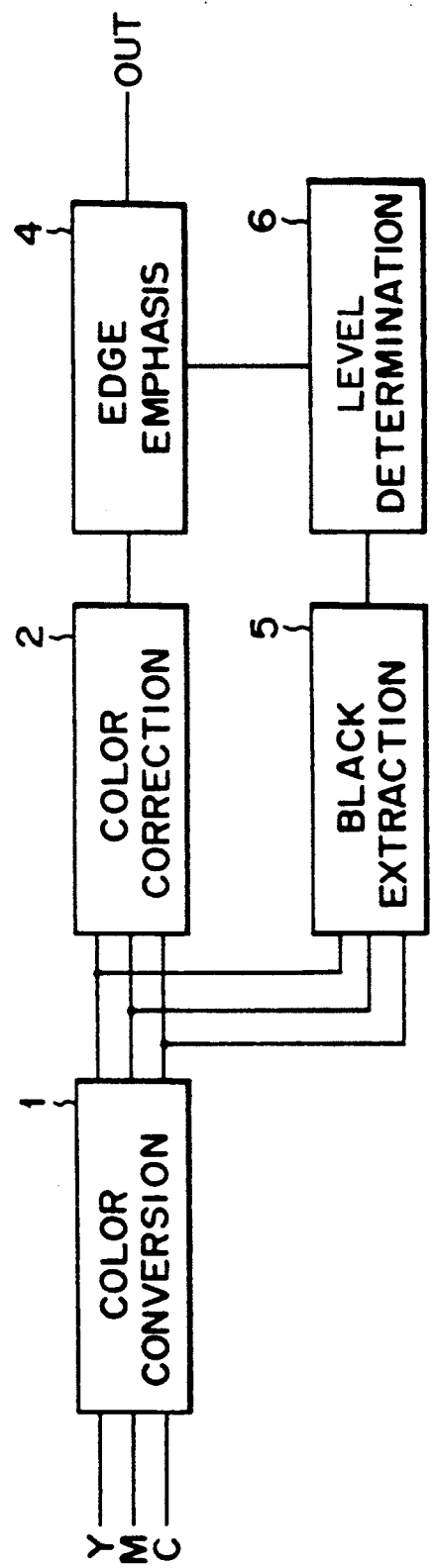
FIG. 1 is a block diagram showing a construction of an embodiment 1 of the present invention.

FIG. 1 shows an embodiment of the invention. Color image signals which are obtained by converting image signals from color sensors (for instance, R, G, B) (not shown) into digital signals by A/D converters are converted such that white=00H and black=FFH in accordance with the relative luminous efficiency characteristics of the human eyes by logarithm converting circuits. Thus, the Y, M, and C signals corresponding to the concentration value are obtained.

The digital signals of Y, M, and C obtained from an image reading section (not shown) are input to a color conversion section 1.

Figure 2:
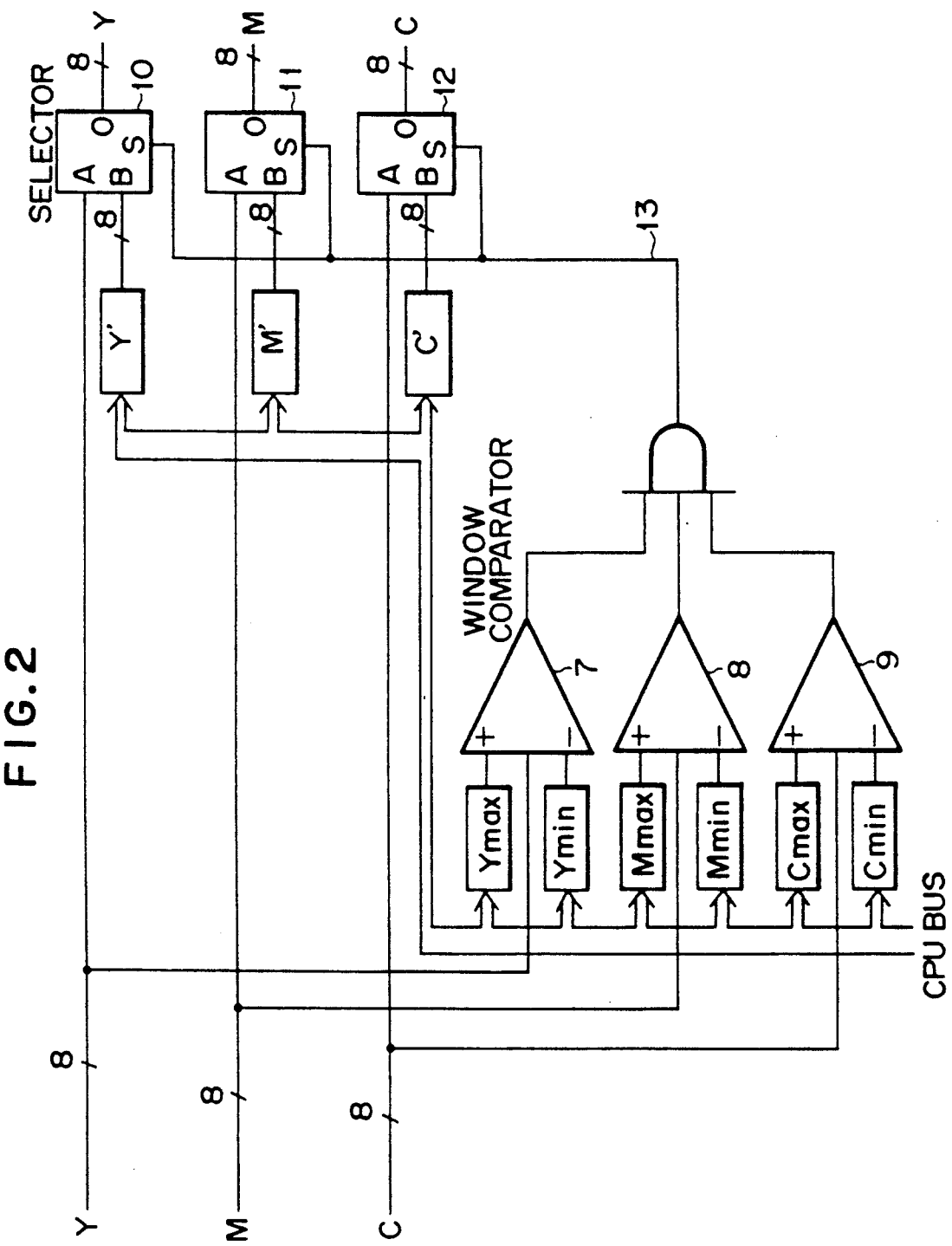
FIG. 2 is a circuit diagram of a color conversion 2.
Figure 3:
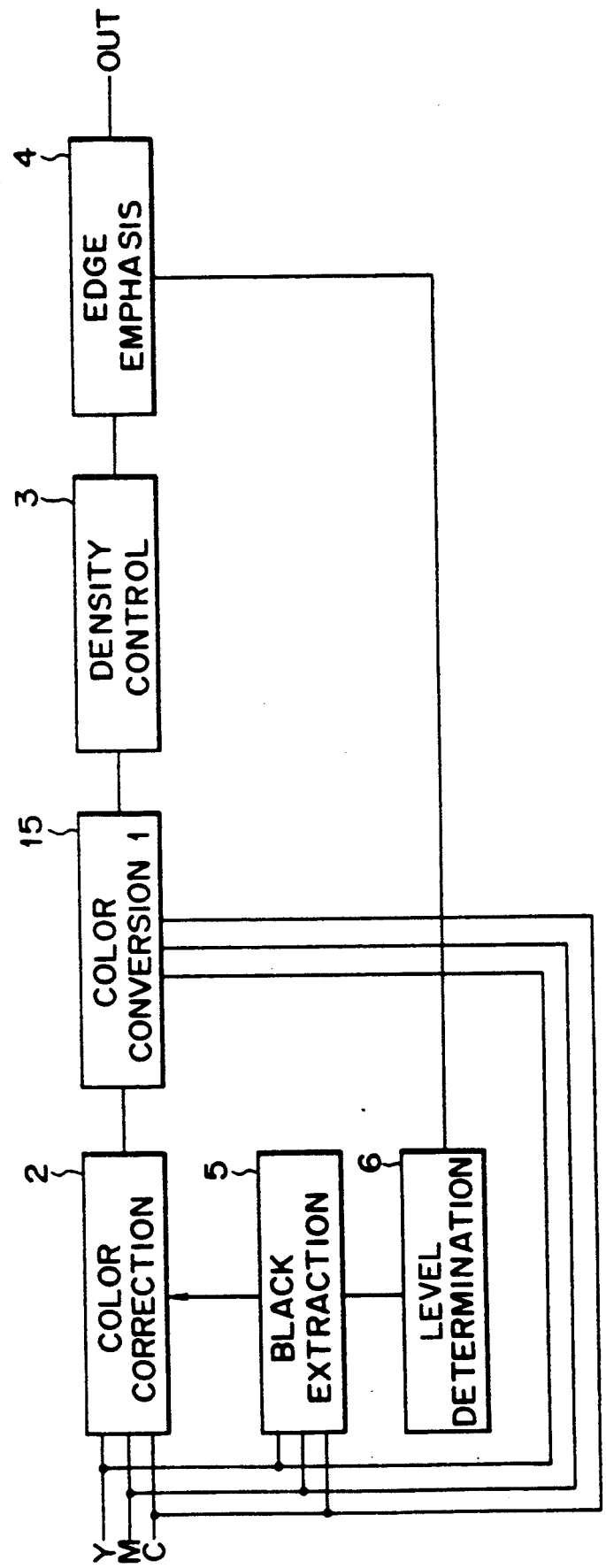
FIG. 3 is a diagram showing a conventional example.

As shown in FIG. 2, in the color conversion section 1, a check is made by three window comparators 7, 8, and 9 to see if the image data of Y, M, and C denote the colors which are color converted or not. If they are the colors to be color converted, a selecting signal 13 is set to the high "H" level and preset image data Y',M', and C' after completion of the color conversion are selected by a CPU (not shown) and the color converting processes are executed.

In FIG. 2, $Y_{max}$, $Y_{min}$, $M_{max}$, $M_{min}$, $C_{max}$, and $C_{min}$ denote registers to store data which are set from the CPU through a CPU BUS for controlling the apparatus of the embodiment.

Y', M', and C' indicate registers to store the color data of predetermined colors after completion of the conversion. Outputs of the registers are input to B input terminals of selectors 10, 11, and 12, respectively.

The color data of the input image are input to A input terminals of the selectors 10, 11, and 12, respectively. Outputs of the window comparators 7, 8, and 9 are supplied to an AND gate and the AND of them is calculated. An output of the AND gate is input to the selectors 10 to 12.

In the above construction, if the window comparators 7 to 9 determine that the color data of the input image lies within a predetermined range which has been set in each of the registers $Y_{max}$, $Y_{min}$, $M_{max}$, $M_{min}$, $C_{max}$, and $C_{min}$, the selectors 10 to 12 are switched so as to output the data which is input to each B input terminal, thereby executing the color converting operation.

The outputs of the color conversion section 1 are input to a color correction section 2 and a black extraction section 5. The color correction section 2, black extraction section 5, a level determination section 6, and an edge emphasis section 4 are well known.

Embodiment 2

Figure 4:
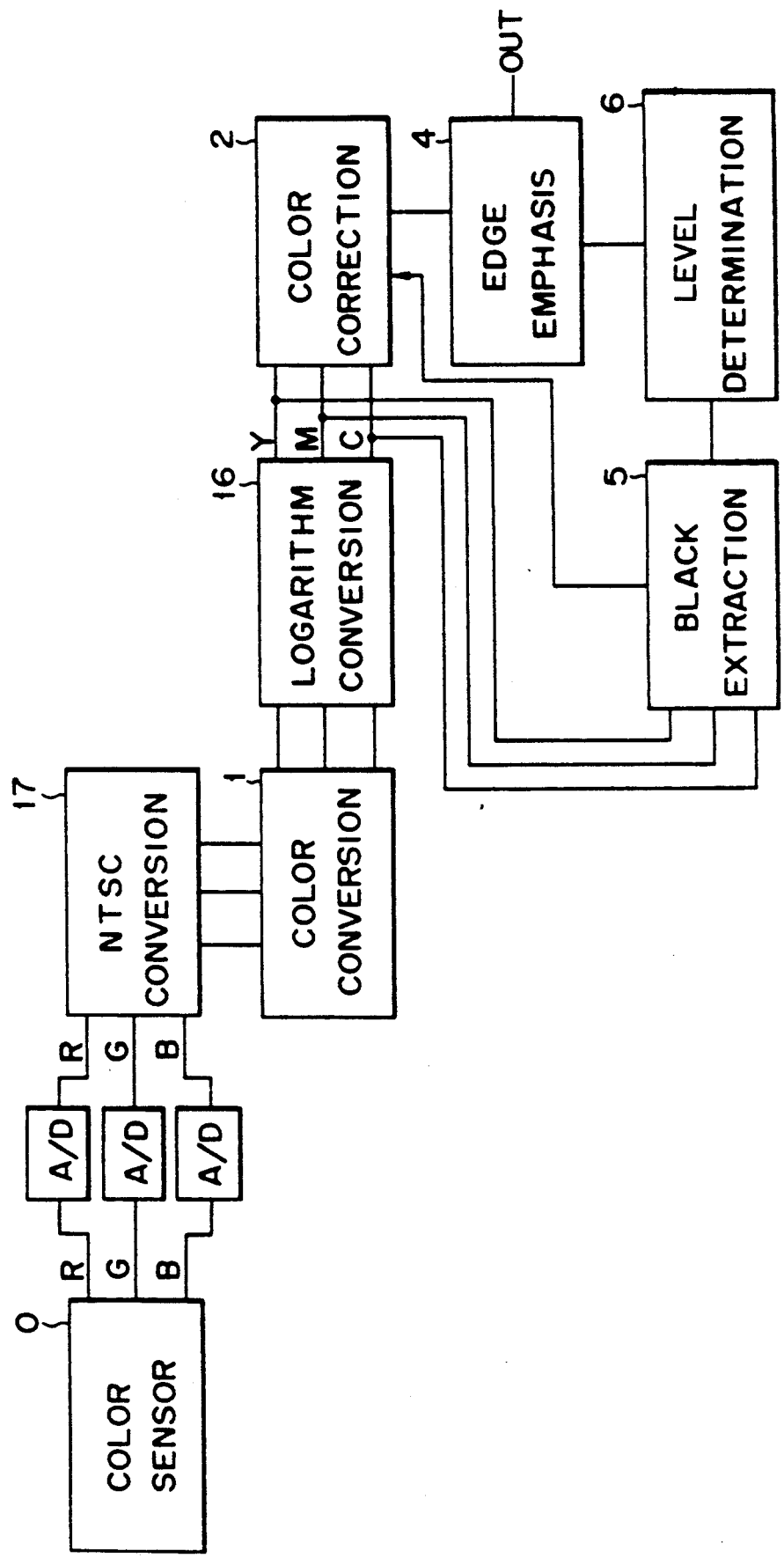
FIG. 4 is a block diagram of an embodiment 2.

FIG. 4 shows the embodiment 2 of the invention. Image signals from color sensors (for instance, R, G, B) 0 are converted into digital signals by A/D converters. The resultant color digital image signals R, G, and B are converted into the R, G, and B signals of the NTSC by an NTSC conversion section 17. The NTSC conversion section comprises well-known 3×3 primary processing circuits.

The image signals which were converted into the R, G, and B signals of the NTSC are input to the color conversion section 1. The color conversion section 1 is similar to that shown in FIG. 1. The color conversion in the image signals of the R, G, and B systems can be also executed in a manner similar to the embodiment 1 by setting corresponding parameters of the image signals such that Y→B, M→G, C→R, Y'→B', M'→G', C'→R', $Y_{max}$→$B_{max}$, $Y_{min}$→$B_{min}$, $M_{max}$→$G_{max}$, $M_{min}$→$G_{min}$, $C_{max}$→$R_{max}$, and $C_{min}$→$R_{min}$.

After the color conversion of the RGB system was executed as mentioned above, the resultant R, G, and B data are input to a logarithm conversion section 16, so that the image signals of the YMC system according to the relative luminous efficiency characteristics of the human eyes as mentioned above are obtained.

Since the color correction section 2, black extraction section 5, level determination section 6, and edge emphasis section 4 are incorporated in the well-known technique as mentioned above, their descriptions are omitted.

Embodiment 3

Figure 5:
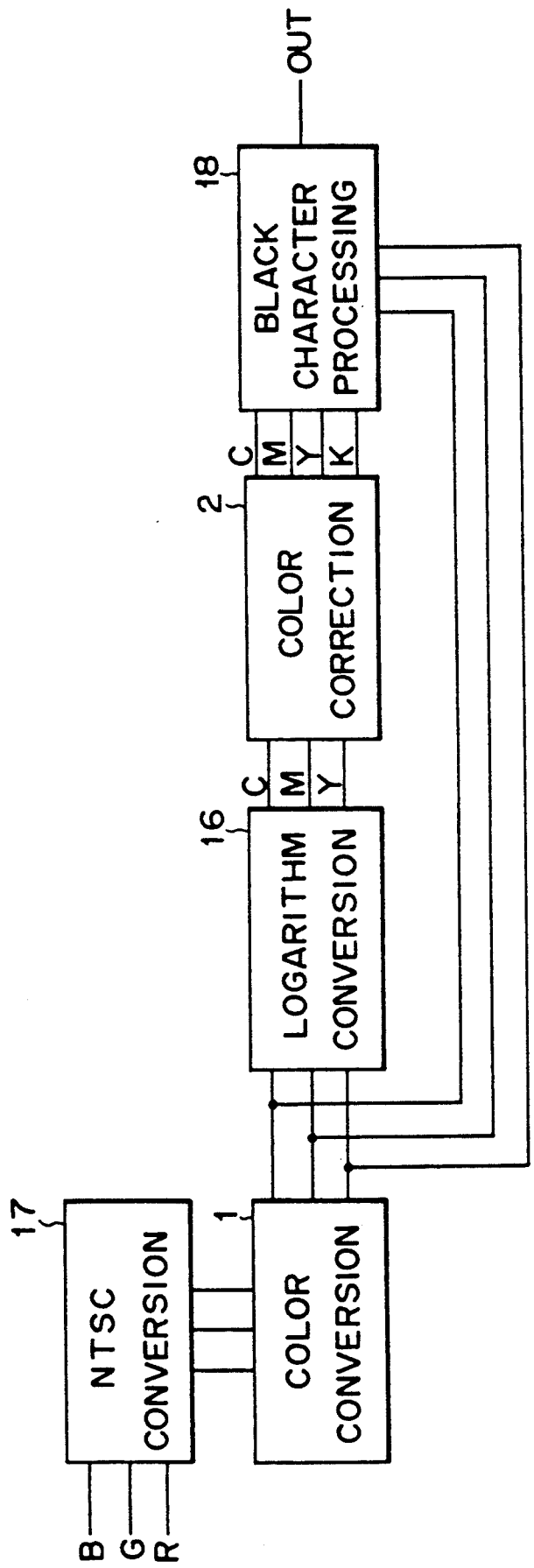
FIG. 5 is a block diagram of an embodiment 3.

FIG. 5 shows an embodiment 3 of the invention. The NTSC conversion section 17, color conversion section 1, and logarithm conversion section 16 are similar to those in the embodiment 2.

The color correction section 2 is the well-known technique and is a circuit to correct the concentration signals of C, M, and Y into the C, M, Y, and K signals according to an output apparatus.

Figure 6A:
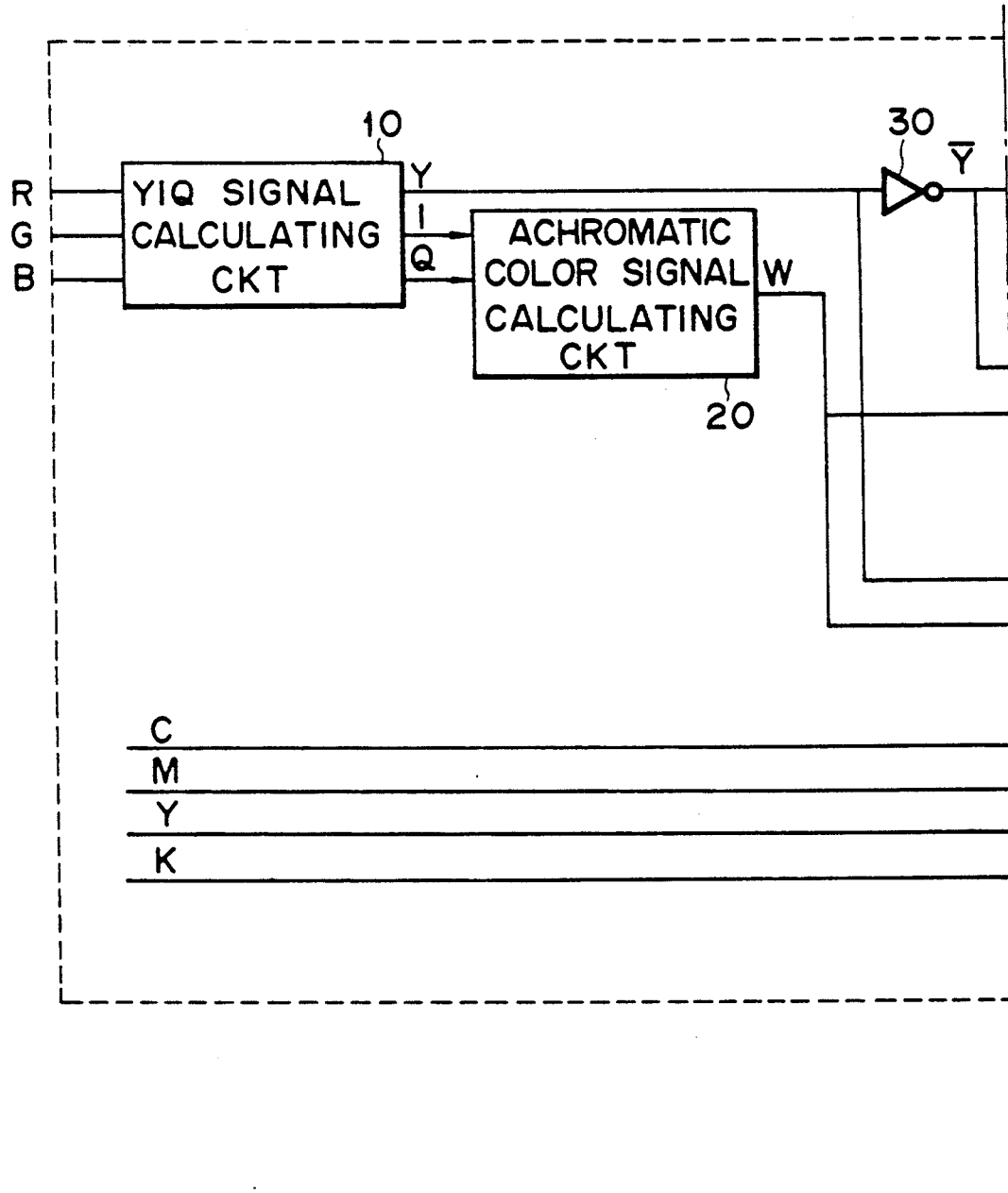
Figure 6B:
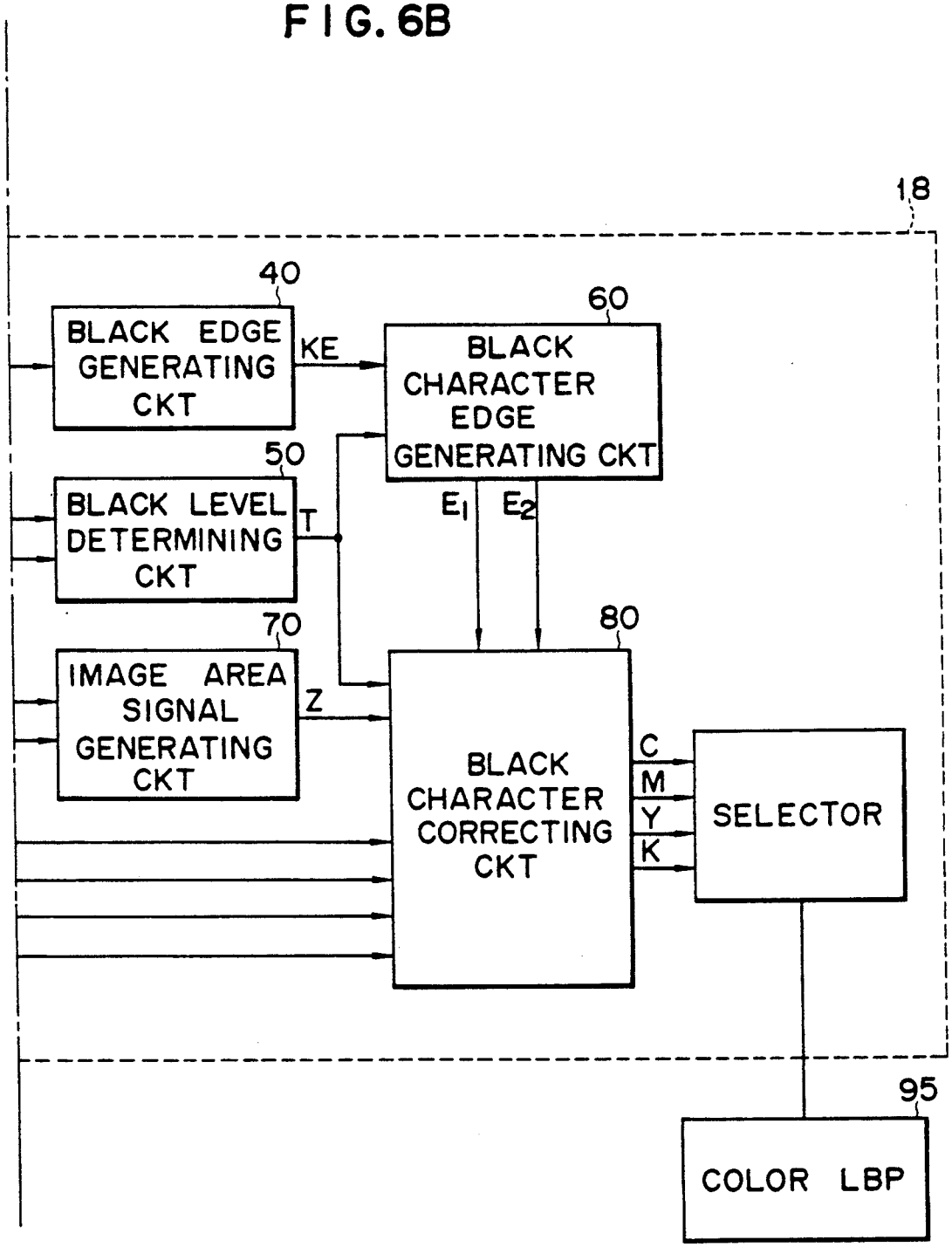

FIGS. 6A and 6B show an example of a circuit construction of a black character processing section 18. In FIGS. 6A and 6B, reference numeral 10 denotes a YIQ signal calculating circuit to calculate a luminance signal Y and color signals I and Q from the R, G, and B signals of the color conversion section 1. The luminance signal Y is inverted into a darkness signal $\overline{Y}$ by an inverter 30 to obtain an edge signal of a black character. Thereafter, the edge signal is extracted by executing the Laplacian operation by a black edge generating circuit 40 and a KE signal is output. The I and Q signals are signals indicative of the color differences from an achromatic color and are input to an achromatic color signal calculating circuit 20. An achromatic color signal W is output from the calculating circuit 20 by using a look-up table. The W signal indicates that the color approaches the achromatic color as the value of the W signal is large. The W signal and $\overline{Y}$ signal are input to a black level determining circuit 50. The circuit 50 combines the W and $\overline{Y}$ signals and outputs a T signal. Practically speaking, the signal indicative of a degree of black is output as a T signal by a binary or more value. The black edge generating circuit 40 outputs black character edge signals $E_1$ and $E_2$ from the black edge signal KE in accordance with the black level signal. The $E_1$ signal is a signal to emphasis the edge of the black character. The $E_2$ signal is a signal to eliminate a color deviation of the edge of the black character. An image area signal generating circuit 70 determines that an area of the bright chromatic color and areas near it are an image area on the basis of the W signal and Y signal and outputs an image area determining signal Z. A black character correcting circuit 80 corrects C (cyan), M (magenta), Ye (yellow), and K (black) by using the black character edge signals $E_1$ and $E_2$ from which an erroneous discrimination was eliminated by the image area signal Z. That is, the $E_2$ signal is added as a correction signal to the C, M, and Y signals and the $E_1$ signal is added as a correction signal to the K signal. The resultant corrected signals are input to an output apparatus such as color printer like, for instance, a color LBP 95 or the like, color monitor, or the like at the next stage.

A block of each circuit shown in FIGS. 6A and 68 will now be described.

(1) In FIGS. 6A and 6B mentioned above, reference numeral 10 denotes YIQ signal calculating means which receives the RGB signals as input signals. The YIQ signal calculating circuit 10 will now be described with reference to FIG. 7. In FIG. 7, reference numerals 25, 26, and 27 denote multipliers to multiply the RGB signals with predetermined parameters $a_{ij}$ (i, j = 1, 2, 3). Reference numeral 28 denotes a memory in which the parameters $a_{ij}$ are stored; 29 indicates a selector to select the proper parameters which are multiplied to the R, G, and B signals; 37 an adder to add outputs of the multipliers 25, 26, and 27; and 38 a selector to select an output of the adder 37 to each of the Y, I, and Q signals. The Y, I, and Q signals are expressed by using the R, G, and B signals and the parameters $a_{ij}$ as follows.

$$Y = a_{11} \times R + a_{12} \times G + a_{13} \times B,$$

$$I = a_{21} \times R + a_{22} \times G + a_{23} \times B,$$

$$Q = a_{31} \times R + a_{32} \times G + a_{33} \times B$$

(2) In FIGS. 6A and 6B, reference numeral 20 indicates the achromatic color signal calculating circuit. FIG. 8 shows an internal construction of the achromatic color signal W calculating circuit. Reference numeral 21 denotes a multiplier to output the square of the I signal; 22 indicates a multiplier to obtain the square of the Q signal; 23 the adder for adding outputs of the multipliers 21 and 22 and outputting $I^2 + Q^2$; and 24 a look-up table to determine the output W in accordance with the result of $I^2 + Q^2$. The output W of the look-up table 24 is determined by the following equation.

$$W = 255 \cdot \exp\left[-\left(\frac{16}{255}\right)^2 \cdot (I^2 + Q^2)\right]$$

(3) In FIGS. 6A and 6B, as mentioned above, the inverter 30 inverts the Y signal and outputs the $\overline{Y}$ signal.

Figure 9:
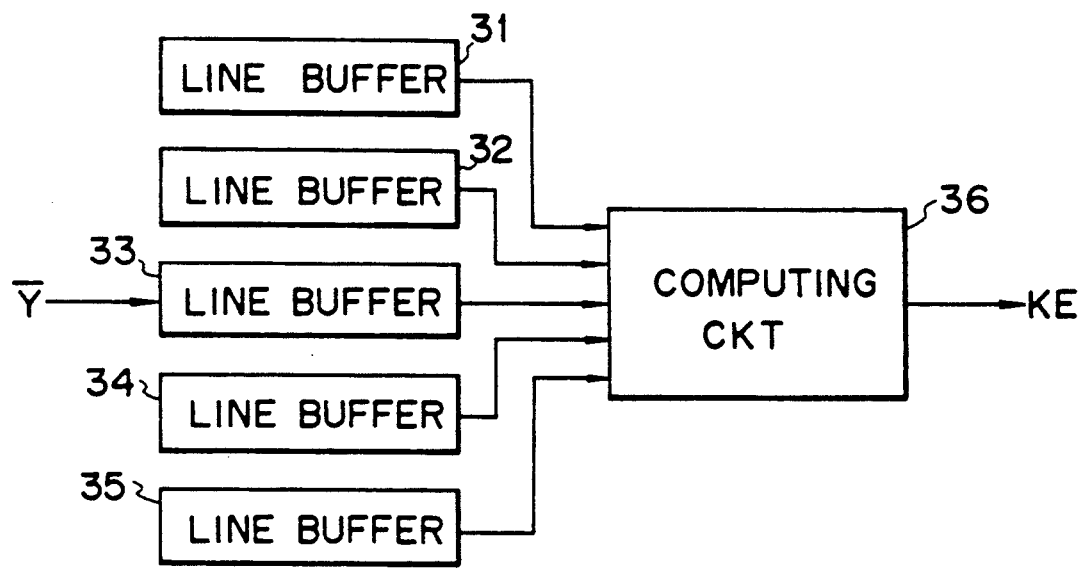
FIG. 9 is a diagram of a black generating circuit.

(4) In FIGS. 6A and 6B, reference numeral 40 indicates the black edge amount KE generating circuit. An internal construction of the black edge generating circuit will now be described with reference to FIG. 9. Reference numerals 31, 32, 33, 34, and 35 denote line buffers in which an objective pixel is set to the center. Reference numeral 36 denotes a computing circuit to calculate the edge amount. Assuming that values $x_{ij}$ (i, j = 1, 2, 3, 4, 5) have been stored in the line buffers, the objective pixel is expressed by $x_{33} = \overline{Y}$. The edge amount KE is obtained by the following equation.

$$KE = x_{33} - (x_{11} + x_{15} + x_{51} + x_{55})/4$$

Figure 10:
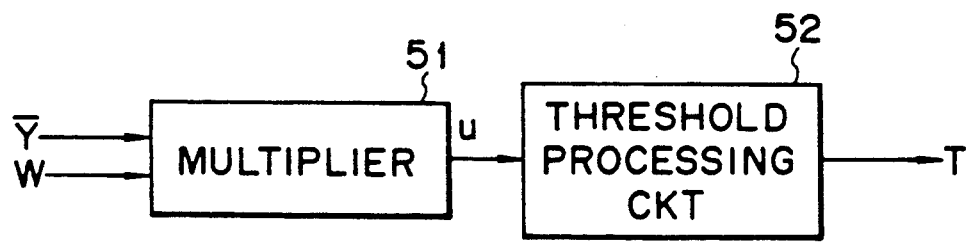
FIG. 10 is a diagram of a black level determination circuit.

(5) In FIGS. 6A and 6B reference numeral 50 denotes the black level determining circuit. FIG. 10 shows an internal construction of the black level determining circuit. Reference numeral 51 indicates a multiplier to multiply the signals $\overline{Y}$ and W. Reference numeral 52 represents a threshold processing circuit for processing an output u of the multiplier 51 and outputting the resultant data as a black level signal T in a manner such that: 0 if $u < T_0$; 1 if $T_0 \leq u < T_1$; 2 if $T_1 < u < T_2$; and 3 if $T_2 \leq u$.

(6) In FIGS. 6A and 6B, reference numeral 60 represents a black character edge generating circuit for outputting two kinds of edge signals $E_1$ and $E_2$ on the basis of the black edge signal KE and black level signal T.

Figure 11:
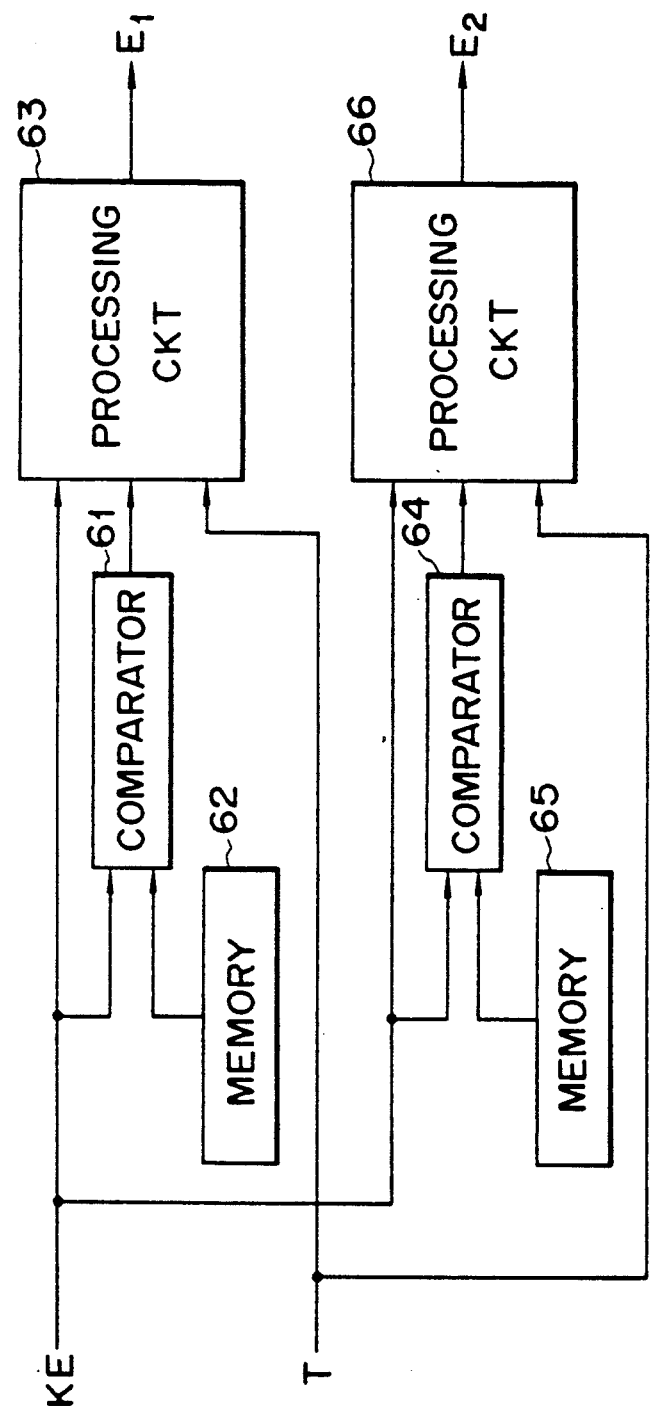
FIG. 11 is a diagram of an edge signal calculating circuit.

FIG. 11 shows a construction of the edge generating circuit 60. Reference numeral 61 denotes a comparator to compare the value of the KE signal with a threshold value stored in a memory 62. When the KE is larger than the threshold value, 1 is output. When the KE is equal to or smaller than the threshold value, 0 is output. Reference numeral 62 denotes the memory to store a predetermined threshold value, and 63 indicates a processing circuit for obtaining the edge signal $E_1$ from the KE signal, the T signal, and an output of the comparator 61.

Practically speaking, the processing circuit 63 outputs $E_1 = 0$ when the output of the comparator 61 is 0 and outputs $E_1 = \alpha_1 \times KE$ when the output of the comparator 61 is 1. $\alpha_1$ denotes a constant which is properly decided in dependence on the value of T and $E_1$ is expressed. Reference numeral 64 indicates a comparator for comparing the value of KE with a threshold value stored in a memory 65. When the KE is larger than the threshold value, 1 is output. When the KE is equal to or smaller than the threshold value, 0 is output. Reference numeral 65 denotes the memory in which a predetermined threshold value is stored. Reference numeral 66 represents a processing circuit to obtain the edge signal $E_2$ from the KE signal, the T signal, and an output of the comparator 64. "0" is stored as a threshold value in the memory 65. When the output of the comparator 64 is 0, the processing circuit 66 outputs $E_2 = -KE \times (-1) \times \alpha_2$. When the output of the comparator 64 is 1, $E_2 = KE \times \alpha_2$ is output. $\alpha_2$ is a constant which is properly determined by the value of T and $E_2$ is expressed.

Figure 12:
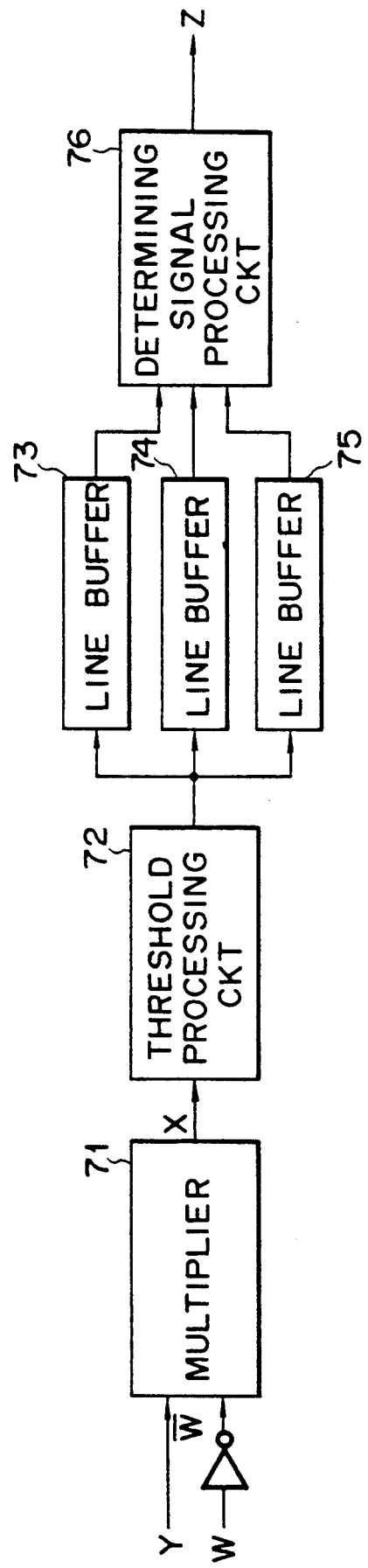
FIG. 12 is a diagram of an image area determination circuit.

(7) In FIGS. 6A and 6B, reference numeral 70 denotes the image area signal generating circuit. FIG. 12 shows an internal construction of the image area signal generating circuit 70. In FIG. 12, reference numeral 71 denotes a multiplier for multiplying the Y signal and the $\overline{W}$ signal obtained by inverting the W signal, thereby obtaining an X signal. Reference numeral 72 denotes a threshold processing circuit for comparing the X signal with a predetermined threshold value and outputting the result of the comparison between them. Reference numerals 73, 74, and 75 indicate line buffers to store an output of the threshold processing circuit 72. Reference numeral 76 represents a determining signal processing circuit for reading out values of the line buffers 73, 74, and 75 around the objective pixel and discriminating whether the objective pixel lies within the image area or not. If it lies within the image area, 1 is output as an image area signal Z. If the objective pixel is out of the image area, 0 is output as the image area signal Z.

Figure 13:
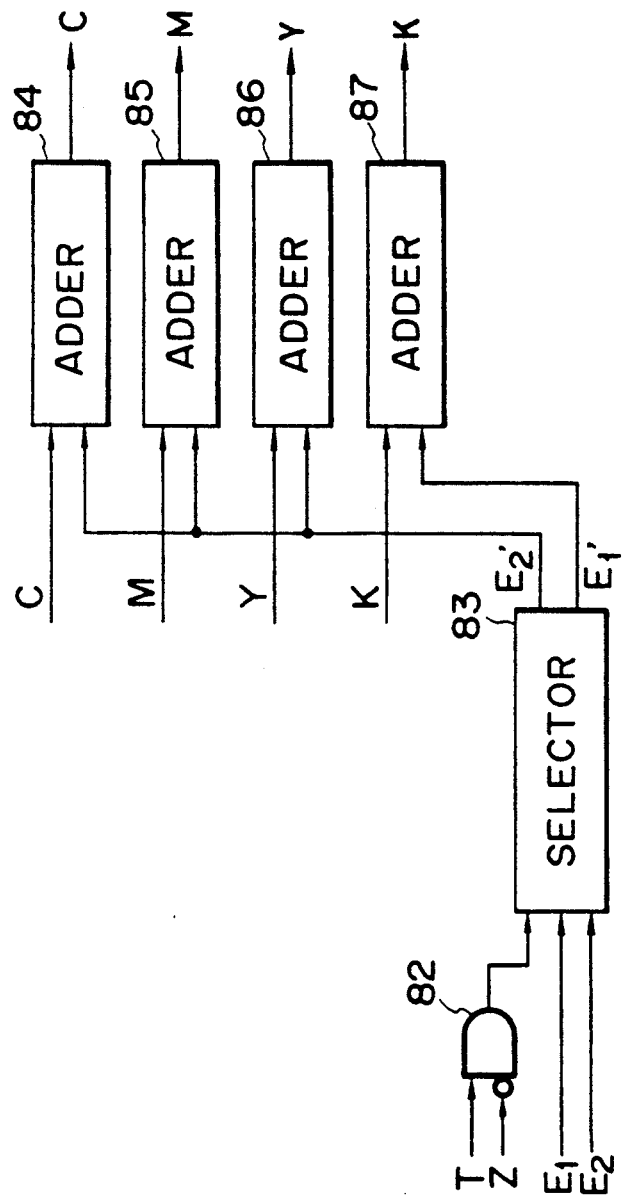
FIG. 13 is a diagram of a black character correction circuit.

(8) In FIGS. 6A and 6B, reference numeral 80 denotes the black character correcting circuit. FIG. 13 shows an internal construction of the black character correcting circuit 80. Reference numeral 82 denotes a gate for outputting 1 when the black level is not 0 and the image area determining signal Z is 0 and outputting 0 in the other cases on the basis of the black level signal T and the image area determining signal Z. Reference numeral 83 indicates a selector to output $E_1' = E_1$ and $E_2' = E_2$ when an output of the gate 82 is 1. The selector 83 outputs $E_1' = 0$ and $E_2' = 0$ when the output of the gate 82 is 0. Reference numeral 84 denotes an adder to add the $E_2'$ signal to the C signal; 85 indicates an adder to add the $E_2'$ signal the M signal; 86 an adder to add the $E_2'$ signal to the Y signal; and 87 an adder to add the $E_1'$ signal to the K signal.

In the above apparatus, the edge emphasis is executed with respect to the area which was determined to be a character portion, while the edge emphasis is not executed with respect to the area which was decided to be a dot color image.

Since the black character process has been executed after the color converting process of the color conversion circuit 1 as shown in FIGS. 1 and 5, as compared with the case where the color converting process is performed before the black character process, an erroneous discrimination in the black character process can be prevented and the accurate process can be executed.

In the embodiments of the invention described above, an edge of the black or achromatic color portion has been extracted for the black character process as an extraction of the characteristics of an image. However, the invention is not limited to such an edge extraction. The invention can be also similarly applied to other characteristic extracting process or the like to extract other characteristics such that, for instance, only the portion of a special color component is extracted and the other portions are masked.

As described above, according to the embodiments, by executing the color converting process before the characteristic extracting process, the erroneous discrimination in the characteristic extraction can be prevented and a good picture quality is obtained.

What is claimed is:

1. A color image processing apparatus comprising:
   inputting means for inputting a color image signal;
   conversion means for converting said color image signal inputted by said inputting means to a color image signal defined by standard color space;
   color conversion means for performing predetermined color conversion on said color image signal defined by standard color space converted by said conversion means; and
   color correction means for performing a color correction to output the color image signal defined by standard color space converted by said color conversion means to an output device.

2. A color image processing apparatus according to claim 1, wherein said color image signal defined by standard color space is an NTSC standard signal.

3. A color image processing apparatus according to claim 1, wherein said inputting means comprises a color sensor.

4. A color image processing apparatus according to claim 1, wherein said color conversion means comprises:
   extracting means for extracting a signal corresponding to a predetermined color from said color image signal defined by standard color space; and
   replacing means for replacing said signal corresponding to said predetermined color extracted by extracting means with a signal corresponding to another color that is different from said predetermined color.

5. A color image processing apparatus according to claim 1, wherein said color correction means corrects said color image signal defined by standard color space to a four color signal of yellow, magenta, cyan and black.

6. A color image processing apparatus according to claim 5, further comprising means for outputting a signal corrected by said color correction means to a color printer.

7. A color image processing method comprising the steps of:
   inputting a color image signal;
   converting the color image signal inputted in the inputting step to a color image signal defined by standard color space;
   performing predetermined color conversion on the color image signal defined by standard color space converted in the conversion step; and
   performing a color correction to output the color image signal defined by standard color space converted in the color conversion step to a output device.

8. A color image processing method according to claim 7, wherein the color image signal defined by standard color space is an NTSC standard signal.

9. A color image processing method according to claim 7, wherein the inputting step is performed by a color sensor.

10. A color image processing method according to claim 7, wherein the color conversion step comprises the steps of:
    extracting a signal corresponding to a predetermined color form the color image signal defined by standard color space; and
    replacing the signal corresponding to the predetermined color extracted in the extracting step with a signal corresponding to another color that is different from the predetermined color.

11. A color image processing method according to claim 7, wherein the color correction step corrects the color image signal defined by standard color space to a four color signal of yellow, magenta, cyan and black.

12. A color image processing method according to claim 11, further comprising the step of outputting a signal corrected in the color correction step to a color printer.

* * * * *

UNITED STATES PATENT AND TRADEMARK OFFICE
CERTIFICATE OF CORRECTION

PATENT NO. : 5,267,031
DATED : KOICHI KATOH, ET AL.
INVENTOR(S) : November 30, 1993

It is certified that error appears in the above-indentified patent and that said Letters Patent is hereby corrected as shown below:

ON THE TITLE PAGE, ITEM [75]:
    At [75], under "Kurita", "Higashi;" should read
--Tokyo;--.

COLUMN 4
    Line 38, "emphasis" should read --emphasize--.
    Line 44, "determining," should read --determining--.

COLUMN 8
    Line 19, "a output" should read --an output--.
    Line 31, "form" should read --from--.

Signed and Sealed this

Twenty-first Day of June, 1994

Attest:

BRUCE LEHMAN

*Attesting Officer*     *Commissioner of Patents and Trademarks*